May 1, 1951  J. E. HOPKINS  2,550,812
SAFETY HITCH FOR TRACTORS
Filed Sept. 22, 1947

INVENTOR.
John E. Hopkins
BY
ATTORNEY

Patented May 1, 1951

2,550,812

UNITED STATES PATENT OFFICE 2,550,812

SAFETY HITCH FOR TRACTORS

John E. Hopkins, Sedgwick, Kans.

Application September 22, 1947, Serial No. 775,421

2 Claims. (Cl. 280—33.15)

This invention has to do generally with the field of farm implements and towing means therefor, and more specifically to a coupling device for interconnecting an automotive vehicle such as a tractor with an implement or the like to be towed thereby, having structure releasable automatically in the event the operator for the tractor falls therefrom, all for the purpose of safety and eliminating the possibility of serious injury by coming into contact with the implement.

It is well known in the art that many people are injured, oftentimes fatally, when falling from tractors and being mangled, cut and crushed by an implement being drawn by the tractor. Occasion for such falling from the tractor may be rough terrain, falling to sleep, sudden illness or other factors.

Many types of coupling mechanisms between tractors and farm implements may be automatically released from the tractor seat but all require an affirmative action on the part of the operator and are not automatically releasable merely because the operator may be dislodged from his operating position.

It is the primary object of this invention, therefore, to eliminate the hazards above set forth occasioned by the conventional type of coupling device, wherein a swingable platform is mounted upon the tractor to be held in an inoperative position by the operator and automatically swinging to a position for unlocking the implement from the tractor when the weight of the operator is released from the platform.

The most important object of this invention is the provision of a safety hitch for tractors having a link on the implement and locking structure on the tractor tow bar operable to attach said link to the tow bar when in one position and having connection with a swingable platform on the tractor for releasing the said link when the platform is at one end of its path of travel.

Another important object of this invention is the provision of a safety hitch for tractors having a platform swingable on a horizontal axis and mounted upon the tractor, said platform having a rearwardly extending arm connected to a releasable lock on the tractor tow bar for attaching the implement thereto, said platform and arm therefore, being operable to release said locking mechanism when the platform swings to the uppermost end of its path of travel.

Figure 1:
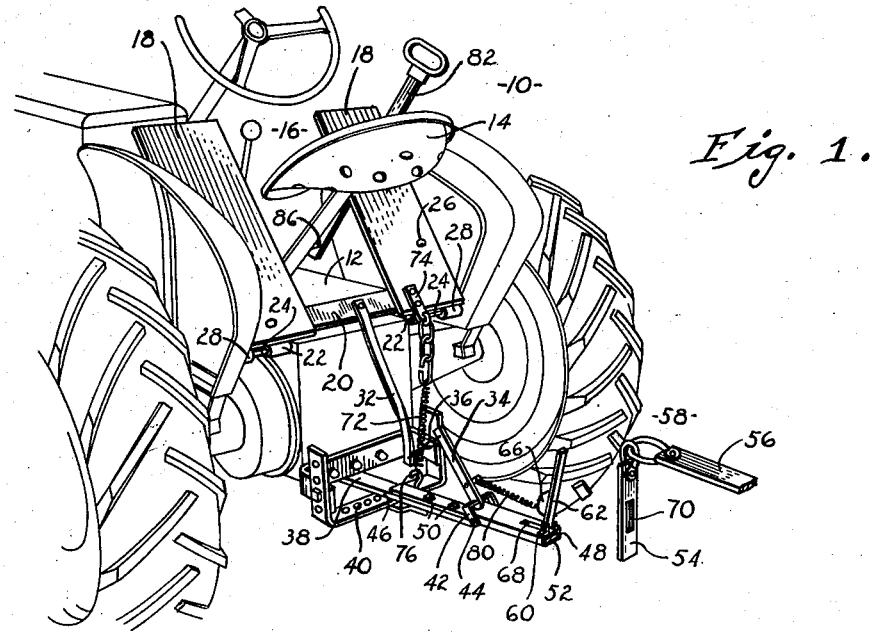
Figure 2:
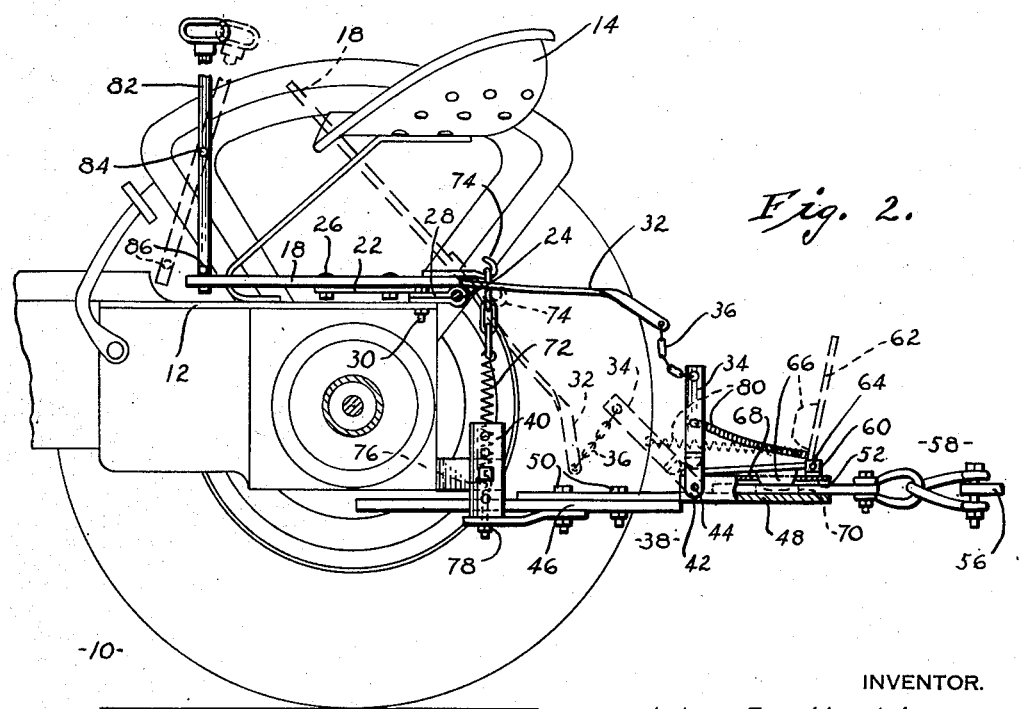

Many additional objects of this invention are important and will be made clear during the course of the following specification, reference being had to the accompanying drawing, wherein:

Fig. 1 is a fragmentary perspective view of a tractor showing the safety hitch operably connected thereto, said hitch being in an inoperative unlocked position; and Fig. 2 is a longitudinal substantially central sectional view through the tractor showing the safety hitch in an operative locked position.

The coupling device about to be described and illustrated in the drawing is understood to be adaptable for interconnecting any automotive vehicle with an implement or the like to be towed thereby. The tractor shown in the drawing, therefore, is for illustrative purposes only, and is broadly designated by the numeral 10.

This tractor 10 is of the well known type and includes a floor 12 upon which is mounted an operator's seat 14. A platform generally designated 16, includes a pair of spaced apart panels 18, one being mounted upon each side of the seat 14 upon the floor 12. These panels 18 of the platform 16 are joined together by a cross bar 20 disposed along the normally rearmost ends thereof.

Hinge structure for mounting the platform 16 upon the floor 12 of the tractor 10 includes an element 22 coiled about and affixed to a pin 24 and secured to the platform 16 in underlying relationship thereto through the medium of bolts or the like 26. An element 28 is similarly rebent upon itself and coiled about the pin 24 and affixed to the floor 12 of tractor 10 through the medium of a bolt 30. In other words, there is a pair of elements 22 and 28 and a hinge pin 24 for each of the panels 18 of the platform 16.

Extending rearwardly from the platform 16 and having one end thereof affixed to the cross bar 20 and intermediate the ends thereof is an elongated arm 32. This arm 32 is joined to an upstanding locking member 34 through the medium of a chain or other flexible member 36. The locking member 34 is pivotally connected to a tow bar 38 forming a part of the tractor 10 and extending beyond a draw bar 40 in the usual manner.

The locking member 34 has a U-shaped bracket 42 at the lowermost end thereof for receiving the tow bar 38 and a pin 44 passing through the bracket 42 and bar 38 serves as a means for pivotally mounting the locking member 34. The tow bar 38 is sectional, one section 46 thereof having connection with the tractor 10 in the usual manner and the other section 48 being joined to the section 46 by bolts 50. The outermost free end of the section 48 of tow bar 38 has a longitudinal polygonal bore 52 therethrough for receiving an elongated link 54 attached to a portion 56 of the frame of an implement (not shown) through the medium of clevis means 58.

A bracket 60 on the uppermost face of the section 48 near the outermost free end thereof pivotally mounts an arm 62 through the medium of a pin 64. This arm 62 has an arcuate projection 66 on one face thereof which is received by a slot 68 formed in the section 48 and communicating with the bore 52 thereof when the arm 62 is in the substantially horizontal position illustrated in Fig. 2.

The link 54 is also provided with a slot 70 disposed to register with the slot 68 within the section 48 when the link 54 is moved into the bore 52 as illustrated in Fig. 2. It is thus clear that when the arm 62 is in the horizontal position shown in Fig. 2, the projection 66 will be disposed within the slots 68 and 70 in the section 48 and link 54 respectively, to interlock link 54 with the tow bar 38.

As clearly illustrated in the drawing, the member 34 projects a distance below the bracket 42 thereof and has its lowermost end spaced above the uppermost face of that portion of section 48 having bore 52 therein. When the arm 62 is in the horizontal locked position, this member 34 may be swung to a substantially vertical position where the lowermost end thereof overlies arm 62 and holds the same in the locked position. When arm 34 is swung from the full line position, shown in Fig. 2, to the dotted line position, the arm 62 will obviously be free to be swung upwardly to the unlocked position shown by dotted lines in Fig. 2. The swinging of the member 34 to the unlocked position shown by dotted lines in Fig. 2, is accomplished by the swinging movement of the platform 16 to the position shown in Fig. 1. This platform 16 is yieldably held in the upward position through the medium of a spring 72 interconnecting the platform 16 adjacent the cross bar 20 through the medium of a hook 74 and joining with the draw bar 40 of tractor 10 at its opposite end by a hook 76 provided with a nut 78 serving to provide means for adjusting the tension of the spring 72.

A spring 80 interconnecting the member 34 at one of its ends and intermediate the end of member 34, and the bracket 60 on section 48, yieldably holds the member 34 in the substantially vertical locked position. A lever 82 pivotally mounted upon the tractor 10 through the medium of a pin 84 has a laterally extending ear 86 on the normally lowermost end thereof disposed to overlie one of the panels 18 of the platform 16 when the same is in the horizontal position adjacent the floor 12 of tractor 10 for holding said platform 16 in a position where the same will not act upon the member 34 when the operator of the tractor is not positioned thereon.

It is clear that when the coupling device is interconnected as above set forth for joining the implement to the tractor 10, the operator upon seat 14 will hold the platform 16 downwardly against the floor 12 by placing his feet upon the panels 18. In the event that he should be thrown from the tractor or otherwise become displaced therefrom and his weight released from the platform 16, the spring 72 will automatically draw the platform 16 to the position shown in Fig. 1. Such operation will cause the arm 32 to swing downwardly and forwardly toward the tractor 10 to swing the member 34 out of locking position with respect to the arm 62. This arm 62 will then automatically snap upwardly to the dotted line position shown in Fig. 2 because of the pull exerted by the implement and the link 54 will be released whereby the implement will stop as the tractor 10 continues forwardly without the operator.

It is clear that when the entire structure is properly used and assembled with a tractor or other automotive vehicle, danger of injury due to falling within the path of travel of the implement being drawn, will be entirely eliminated and many casualties thereby avoided.

While only one form of my invention has been shown and described, it is to be understood that many changes, particularly with respect to details of construction, may be made without departing from the spirit of this invention or scope of the appended claims.

Having thus described the invention, what is claimed as new and desired to be secured by Letters Patent is:

1. An implement hitch comprising a tubular tow member having a perforated side; a perforated bar extending into said member at one end thereof; an arm swingable on the member toward and away from said perforated side and having an element passing through the perforations of said side and the bar when the arm is at one end of its path of travel adjacent said perforated side; and a U-shaped locking device pivotally mounted on the member for swinging movement to and from a position partially embracing said arm when the latter is at said one end of its path of travel for holding the arm between said perforated side of the tow member and the bight of said locking device and against swinging movement toward the opposite end of its path of travel away from said perforated side.

2. In a tractor having a main horizontal platform, a tow bar, and releasable means adapted for coupling said tow bar with an implement; a secondary platform normally superimposed upon said main platform, said platforms being hingedly interconnected at the proximal rearmost edges thereof for swinging movement of the secondary platform on a horizontal axis toward and away from the uppermost face of the main platform; an arm rigid to the secondary platform and extending rearwardly therefrom beyond the hinge connection between said platforms; and means joining said arm and said releasable means for releasing the latter as the secondary platform swings away from the main platform.

JOHN E. HOPKINS.

REFERENCES CITED

The following references are of record in the file of this patent:

UNITED STATES PATENTS

| Number | Name | Date |
| --- | --- | --- |
| 945,683 | Beydler et al. | Jan. 4, 1910 |
| 1,652,345 | Brinkman | Dec. 13, 1927 |
| 2,272,724 | O'Keane | Feb. 10, 1942 |